United States Patent
Griffee et al.

(10) Patent No.: US 11,952,061 B2
(45) Date of Patent: Apr. 9, 2024

(54) DROP DECK TRAILER WITH SUSPENSION SYSTEM, LOADING SYSTEM, AND INTERCHANGEABLE DECK SYSTEM

(71) Applicants: Gary L. Griffee, Alliance, NE (US); Nathan Boyer, Gardner, KS (US)

(72) Inventors: Gary L. Griffee, Alliance, NE (US); Nathan Boyer, Gardner, KS (US)

(73) Assignee: Gary L. Griffee, Alliance, NE (US)

( * ) Notice: Subject to any disclaimer, the term of this patent is extended or adjusted under 35 U.S.C. 154(b) by 462 days.

(21) Appl. No.: 17/193,817

(22) Filed: Mar. 5, 2021

(65) Prior Publication Data

US 2021/0276636 A1    Sep. 9, 2021

Related U.S. Application Data

(60) Provisional application No. 62/986,100, filed on Mar. 6, 2020.

(51) Int. Cl.
| | |
|---|---|
| *B62D 53/06* | (2006.01) |
| *B60P 1/02* | (2006.01) |
| *B60P 1/36* | (2006.01) |
| *B60P 1/44* | (2006.01) |
| *B60P 1/52* | (2006.01) |
| *B60P 3/06* | (2006.01) |

(52) U.S. Cl.
CPC ............ *B62D 53/062* (2013.01); *B60P 1/025* (2013.01); *B60P 1/36* (2013.01); *B60P 1/4471* (2013.01); *B60P 1/4492* (2013.01); *B60P 1/52* (2013.01); *B60P 3/06* (2013.01)

(58) Field of Classification Search
CPC ..... B62D 53/062; B62D 63/062; B60P 1/025; B60P 1/36; B60P 1/40; B60P 1/4471; B60P 1/4492; B60P 1/52; B60P 3/06; B60P 7/16; B60P 1/02; B60P 1/4414; B60G 2500/30
See application file for complete search history.

(56) References Cited

U.S. PATENT DOCUMENTS

| | | | | |
|---|---|---|---|---|
| 2,230,014 | A | * | 1/1941 | Raven ................... B60P 1/025 254/8 R |
| 2,534,057 | A | * | 12/1950 | Pride ....................... B60P 1/52 414/500 |
| 3,010,593 | A | | 11/1961 | Adams et al. |

(Continued)

FOREIGN PATENT DOCUMENTS

GB        2160832 A  *  1/1986  ........... B60G 17/033

*Primary Examiner* — Paul N Dickson
*Assistant Examiner* — Matthew D Lee
(74) *Attorney, Agent, or Firm* — Sheridan Ross P.C.

(57) ABSTRACT

A drop deck trailer is provided with a deck that has the ability to raise and lower to conveniently load and unload goods and materials on the deck. A pneumatic system can raise and lower the deck and also serve as a suspension system for the trailer to dampen the relative movement between a frame and the deck. In addition, some embodiments of the trailer have a deck with a movable carriage that can move along the deck to automatically load a vehicle such as a golf cart. The carriage has rollers that secure the front wheels of a vehicle, and the carriage moves along the decks to pull the vehicle onto the deck. Moreover, various embodiments of a trailer frame can selectively connect to different decks to allow each deck to be specialized for particular goods and materials.

20 Claims, 7 Drawing Sheets

(56) References Cited

U.S. PATENT DOCUMENTS

| | | | | |
|---|---|---|---|---|
| 3,346,132 | A * | 10/1967 | Duszka | B60P 1/36 414/522 |
| 3,572,563 | A * | 3/1971 | Oliver | B60P 1/36 414/679 |
| 3,589,537 | A * | 6/1971 | Petersen | B60P 1/4414 414/545 |
| 4,058,325 | A * | 11/1977 | Schramm | B62D 53/065 414/469 |
| 4,746,133 | A * | 5/1988 | Hanser | B60S 9/12 180/41 |
| 4,792,274 | A | 12/1988 | Cockram | |
| 4,878,691 | A | 11/1989 | Cooper et al. | |
| 5,052,713 | A | 10/1991 | Corey et al. | |
| 5,387,070 | A * | 2/1995 | Roeling | B60P 3/06 410/3 |
| 5,394,583 | A * | 3/1995 | Plate | B60P 3/122 414/400 |
| 5,405,236 | A * | 4/1995 | Sundstrom | B66F 7/0625 414/495 |
| 5,906,470 | A * | 5/1999 | Desjardins | B60P 1/025 296/184.1 |
| 6,019,565 | A * | 2/2000 | Gesuale | B60P 1/025 254/10 R |
| 6,068,276 | A | 5/2000 | Kallstrom | |
| 6,179,546 | B1 * | 1/2001 | Citrowske | A61G 3/067 414/921 |
| 6,273,435 | B1 | 8/2001 | Stringer | |
| 6,349,952 | B1 | 2/2002 | Kallstrom | |
| 6,412,789 | B1 | 7/2002 | Pierce et al. | |
| 6,648,578 | B1 * | 11/2003 | Rouse | B60P 1/02 414/812 |
| 6,923,452 | B1 | 8/2005 | Zachmeier et al. | |
| 7,874,568 | B1 | 1/2011 | Pelligrino | |
| 8,186,704 | B2 | 5/2012 | Cesternino | |
| 8,562,720 | B2 | 10/2013 | Stutzman et al. | |
| 9,050,920 | B2 | 6/2015 | Aubrey et al. | |
| 9,714,060 | B2 | 7/2017 | Aiello | |
| 2003/0067136 | A1 | 4/2003 | Scott et al. | |
| 2003/0085562 | A1 | 5/2003 | Sparling | |
| 2003/0086778 | A1 * | 5/2003 | Smith | B60P 3/07 414/500 |
| 2005/0000929 | A1 | 1/2005 | Dunn | |
| 2007/0151221 | A1 * | 7/2007 | Bergsten | A01D 42/08 56/15.8 |
| 2009/0155034 | A1 | 6/2009 | Fonseca, Jr. | |
| 2012/0020762 | A1 * | 1/2012 | Roose | B60P 1/025 280/6.151 |
| 2017/0282775 | A1 * | 10/2017 | Ochenkowski | B60P 1/4442 |

\* cited by examiner

DROP DECK TRAILER WITH SUSPENSION SYSTEM, LOADING SYSTEM, AND INTERCHANGEABLE DECK SYSTEM

CROSS-REFERENCE TO RELATED APPLICATIONS

This application claims priority under 35 U.S.C. § 119(e) to U.S. Provisional Patent Application Ser. No. 62/986,100 filed Mar. 6, 2020, which is incorporated herein in its entirety by reference.

BACKGROUND

Trailers are commonly used to transport goods and materials that do not easily fit into, for example, the bed of a truck or other powered vehicle. Trailers are typically used to transport tools, other vehicles such as golf carts, livestock, boats, people, etc. Most trailers comprise a deck to receive goods and materials, a pair of wheels for movement, and a tongue to connect the trailer to a powered vehicle. The powered vehicle tows the trailer along with the goods and materials to a destination where the goods and materials can be unloaded and/or the trailer can be disconnected from the powered vehicle and left at the destination.

Some trailers have a deck that receives goods and materials where the deck raises and lowers relative to the rest of the trailer to more easily receive goods and materials. When a trailer is used to transport a vehicle or other heavy load, it can be difficult to maneuver the vehicle or load onto the deck, which is elevated above the ground. Therefore, the deck can be lowered to, or proximate to, the ground using hydraulics or another power system. Once the vehicle or load is moved onto the deck, the deck is raised above the ground, and a vehicle can tow the trailer to a destination.

However, there are deficiencies with these movable decks and existing trailers in general. First, most trailers have a basic suspension system such as leaf springs, or even no suspension at all. Thus, bumps from a roadway are readily transmitted to the goods or materials on the trailer, which may not present an issue for durable goods and materials. However, for a trailer with a movable deck, these forces can be a detriment to a hydraulic system or other system that raises and lowers the deck of a trailer. Moreover, movable decks are used to transport goods and materials with limited durability. For instance, a movable deck can be used to transport a golf cart, which itself does not have a robust suspension system due to its use on a golf course. Therefore, existing trailer suspension systems can result in damage to the golf cart and its components. Moreover, commonly used tie down straps or chains attach to a frame of a golf cart, and when the straps or chains are tightened, the suspension system of the golf cart is compressed. When the trailer experiences bumps during transportation, the straps or chains can loosen or tighten and cause stress on the golf cart and trailer.

In addition, while the raising and lowering of the deck in existing trailers is powered, the manual loading and unloading of goods and materials on to the deck can present opportunities for injuries. For example, a user can be squeezed between a load and the frame of a trailer during loading or unloading of the deck and during raising or lowering of the deck. Furthermore, some goods and materials require specialized features on a trailer such as a roof or cage. Yet, a given user may only have one trailer, and these specialized features are added and removed each time the trailer is used for a different purpose, wasting time and resources.

SUMMARY

A trailer with a movable deck is provided that addresses the shortcomings of previous trailers. The trailer can have a lift system that raises and lower the deck and that also serves as a suspension system for the trailer. This reduces wear and tear on the trailer as well as the goods and materials on the trailer. Moreover, some embodiments of the trailer can include an automatic or semi-automatic loading, unloading, and tie down system to move and secure a vehicle such as a golf cart, side-by-side, or other all-terrain vehicle onto the deck of the trailer. This reduces the likelihood of injuries since a user is not positioned on or within the trailer. In addition, some embodiments of the trailer have a modular deck system where different decks with specialized features can be easily be swapped in and out of the same trailer frame, saving time and resources. An enclosed deck with a loading and unloading system can substitute as a garage for the vehicle in various embodiment. This can be especially useful in the communities where golf carts and other similar vehicles are used for transportation.

It is an aspect of embodiments of the present disclosure to provide a trailer with a power system such as a pneumatic system that raises and lowers a deck and that also serves as a suspension system for the trailer. The pneumatic system can comprise a pump that compresses air and a component such as an airbag that translates pressurized air into physical movement or displacement. A system of rails and cantilever arms then translates the physical movement of the airbag into a raising and lowering movement for a deck. Once the pneumatic system raises the deck, the pressurized air then dampens the relative movement between the deck and the frame. This reduces wear and tear on the trailer and its components as well as the forces experienced by the goods and materials on the deck.

It is a further aspect of embodiments of the present disclosure to provide a trailer with a movable carriage that selectively secures onto the front wheels of a vehicle and then moves the vehicle onto the deck of the trailer. Some embodiments of the trailer have a deck with a movable carriage, which moves between a front end and a back end of the trailer. To load a vehicle onto the trailer, first the deck lowers to the ground. Then, with the carriage positioned at the back end of the deck, rollers can extend from the carriage to secure the front wheels of a vehicle. Next, the carriage moves across the deck to the front end of the deck to pull the vehicle onto the deck and secure against wheel stops ready for travel without the need for cumbersome tie down straps or chains. Lastly, the deck raises to clear the ground, and a powered vehicle can tow the trailer. As described in detail below, a motor and screw system can move the carriage along the deck, and a system of sensors and/or input devices can be used to automate or semi-automate the loading and unloading process. In other embodiments, a chain and sprocket move one or more carriages along the deck.

It is another aspect of embodiments of the present disclosure to provide a trailer with a modular deck that can selectively connect to and disconnect from a frame of the trailer. The frame of the trailer can be connected to the deck via cantilever arms. A lower pin, with a roller attached, on each cantilever arm can pass vertically through an opening in a top surface of the deck. Once in this position, in some embodiments, a safety pin can be positioned through the channel to secure the connection between the pins of the cantilever arms and the channel. This quick connection system allows for decks to be specialized for different materials and goods. Then, a trailer frame can simply connect to a deck and then a powered vehicle can tow the trailer.

One particular embodiment of the present disclosure is a drop deck trailer with a lifting and suspension system, comprising a frame having an inner surface that defines an opening, the frame having a plurality cantilever arms rotatably connected to the inner surface; a rail rotatably connected to an upper end of each cantilever arm of the plurality of cantilever arms; a deck positioned in the opening of the frame and rotatably connected to a lower end of each cantilever arm of the plurality of cantilever arms; and a power system operably connected to an end of the rail, wherein the power system displaces the rail in a substantially horizontal direction to raise and lower the deck in a substantially vertical direction, and the power system dampens a relative movement between the frame and the deck.

In some embodiments, the power system is a pneumatic air system having a pump operably connected to a reservoir; an airbag operably connected to the reservoir and operably connected to the end of the rail, wherein the pump increases air pressure in the reservoir, which selectively pressurizes the airbag to displace the rail and move the deck in the substantially vertical direction. In various embodiments, the power system is a hydraulic system having a pump operably connected to an accumulator; a cylinder operably connected to the accumulator and operably connected to the end of the rail, wherein the pump increases a pressure of a working fluid in the accumulator, which drives a piston of the cylinder to displace the rail and move the deck in the substantially vertical direction. In some embodiments, for each cantilever arm of the plurality of cantilever arms, an axis between the rotatable connections with the rail and the frame forms an angle with an axis between the rotatable connections with the frame and the deck, wherein the angle is between 70 degrees and 110 degrees. In various embodiments, for each cantilever arm of the plurality of cantilever arms, a distance between the rotatable connections with the rail and the frame is less than a distance between the rotatable connections with the frame and the deck.

In some embodiments, the trailer further comprises a dampener having one end connected to the rail and another end connected to the frame to further dampen the relative movement between the frame and the deck. In various embodiments, the trailer further comprises a carriage that is movable between a back end and a front end of the deck to draw a vehicle onto the deck.

Another particular embodiment of the present disclosure is a drop deck trailer with a powered loading system, comprising a frame having an inner surface that defines an opening, the frame having a plurality cantilever arms rotatably connected to the inner surface; a deck positioned in the opening of the frame and rotatably connected to a lower end of each cantilever arm of the plurality of cantilever arms such that the deck is raised and lowered relative to the frame; and a carriage positioned on a top surface of the deck, wherein the carriage is configured to receive at least one wheel of a vehicle, and a power system drives the carriage in a longitudinal direction of the deck from a back end of the deck to a front end of the deck to draw the vehicle onto the deck.

In some embodiments, the trailer further comprises first and second rim rollers connected to the carriage, wherein the first and second rim rollers are configured to extend outward in a lateral direction of the deck to secure two wheels of the vehicle to the carriage. In various embodiments, the trailer further comprises a chain loop connected to the carriage, wherein the power system is a motor with a shaft that drives the chain loop in one direction to move the carriage from the back end to the front end of the deck, and the shaft drives the chain loop in an opposing direction to move the carriage from the front end to the back end of the deck. In some embodiments, the trailer further comprises a second carriage connected to a second chain loop, wherein the shaft drives the second chain loop such that both carriages move from the back end to the front end as the shaft rotates in one direction, and both carriages move from the front end to the back end as the shaft rotates in the opposing direction.

In various embodiments, the trailer further comprises at least one guide rail positioned on the deck, wherein the carriage has at least one roller positioned in the at least one guide rail to secure and direct movement of the carriage between the back end and the front end of the deck. In some embodiments, the at least one guide rail is a unistrut, and the roller travels within the unistrut. In various embodiments, the trailer further comprises a rail rotatably connected to an upper end of each cantilever arm of the plurality of cantilever arms, and a second power system operably connected to an end of the rail, wherein the second power system displaces the rail in a substantially horizontal direction to raise and lower the deck in a substantially vertical direction, and the second power system dampens a relative movement between the frame and the deck.

Another particular embodiment of the present disclosure is a drop deck trailer with a selectively attachable deck, comprising a deck extending between a front end and a back end, the deck having a channel extending along the deck, and the deck having an opening extending into the channel; a frame having an arm extending proximate to the side of the deck, the arm having an inner surface; and a plurality of cantilever arms rotatably connected to the inner surface of the arm, wherein a pin on a lower end of a cantilever arm of the plurality of cantilever arms has a width that is less than a width of the opening and greater than a width of the channel, and the pin extends through the opening to selectively connect the deck and the frame.

In various embodiments, the trailer further comprises a roller assembly positioned within the channel and configured to move through the channel, and wherein the pin is received in a recess of the roller assembly to selectively connect the deck and the frame. In some embodiments, wherein the roller assembly comprises at least two rollers, and the recess is positioned between two rollers. In various embodiments, the roller assembly is in a first position proximate to the opening to receive the pin, and the roller assembly moves to a second position in the channel to lock the pin within the channel. In some embodiments, the trailer further comprises a second pin that selectively engages the channel and the roller assembly to lock the roller assembly in the second position and the pin of the cantilever arm within the channel. In various embodiments, the channel is an open end of a unistrut, and the open end is oriented upwards.

One particular embodiment is a method for loading a vehicle onto a deck of a trailer comprising: (i) lowering a deck of a trailer relative to a frame of a trailer, wherein at least one cantilever arm is rotatable connected to said deck, said frame, and a rail; (ii) positioning at least one wheel of a vehicle proximate to a carriage of said deck, wherein said at least one wheel is secured to said carriage, (iii) moving said carriage from a back end to a front end of said deck to draw said vehicle onto said deck, (iv) raising said deck by displacing said rail with a power system, wherein said power system, said rail, and said at least one cantilever arm serve as a suspension system to dampen movement of said deck relative to said frame as said trailer moves over a ground surface.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements or components. Additional aspects of the present disclosure will become more readily apparent from the Detailed Description, particularly when taken together with the drawings. In addition, details about the present disclosure can be found in Appendices A, B, and C, which are incorporated in their entireties by reference.

The above-described embodiments, objectives, and configurations are neither complete nor exhaustive. As will be appreciated, other embodiments of the disclosure are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and claims themselves.

BRIEF DESCRIPTION OF THE DRAWINGS

The accompanying drawings, which are incorporated in and constitute a part of the specification, illustrate embodiments of the disclosure and together with the Summary given above and the Detailed Description of the drawings given below, serve to explain the principles of these embodiments. In certain instances, details that are not necessary for an understanding of the disclosure or that render other details difficult to perceive may have been omitted. It should be understood, of course, that the disclosure is not necessarily limited to the particular embodiments illustrated herein. Additionally, it should be understood that the drawings are not necessarily to scale.

Figure 1:
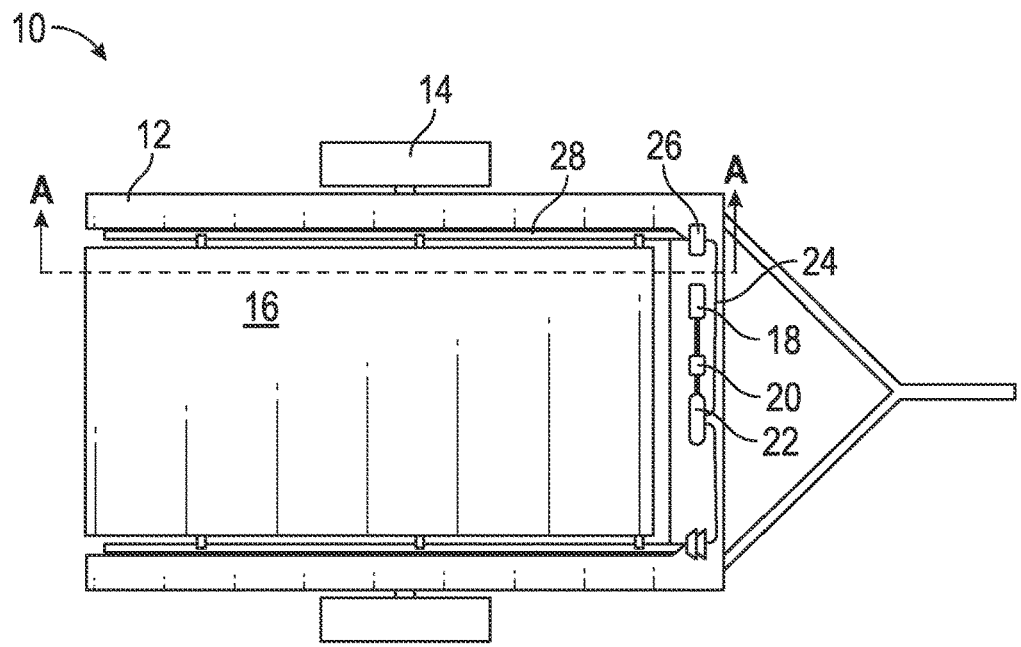
FIG. 1 is a top plan view of a trailer in accordance with an embodiment of the present disclosure.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

A list of the various components shown in the drawings and associated numbering is provided herein:

Number Component
10 Trailer
12 Frame
14 Wheel
16 Deck
18 Battery
20 Pump
22 Reservoir
24 Line
26 Airbag
28 Rail
30 Cantilever Arm
32a, 32b, 32c Pin 33a, 33b Axis
34 Angle
36 Shock Absorber
38a, 38b Track
40b Rail
42 Motor
44 Screw
46 Flange
48a, 48b Wheel Stop
50 Carriage
52a, 52b Front Roller
54a, 54b Rim Roller
56a, 56b Wheel
58a, 58b, 58c, 58d Sprocket
60a, 60b, 60c, 60d Chain
62 Strut
64 Pin
66 Strut
68 Channel
70 Opening
72 Roller Assembly
74 Body
76 Recess
78 Roller
80 Pin
82 Opening Diameter
84 Channel Diameter
86 Pin Diameter
88 Aperture
90 Pin
92 Deck Connection Rail
94 Jack
96 Recess
98 Actuator
100 Pin

DETAILED DESCRIPTION

The present disclosure has significant benefits across a broad spectrum of endeavors. It is the Applicant's intent that this specification and the claims appended hereto be accorded a breadth in keeping with the scope and spirit of the disclosure being disclosed despite what might appear to be limiting language imposed by the requirements of referring to the specific examples disclosed. To acquaint persons skilled in the pertinent arts most closely related to the present disclosure, a preferred embodiment that illustrates the best mode now contemplated for putting the disclosure into practice is described herein by, and with reference to, the annexed drawings that form a part of the specification. The exemplary embodiment is described in detail without attempting to describe all of the various forms and modifications in which the disclosure might be embodied. As such, the embodiments described herein are illustrative, and as will become apparent to those skilled in the arts, may be modified in numerous ways within the scope and spirit of the disclosure.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the present disclosure are described herein and as depicted in the drawings. It is expressly understood that although the figures depict a trailer, the present disclosure is not limited to these embodiments.

Now referring to FIG. 1, a top plan view of a trailer 10 is provided. The trailer 10 has a frame 12 with a pair of wheels 14 and a tongue that selectively connects to a vehicle for the vehicle to tow the trailer 10. In various embodiments, the trailer 10 has greater than two wheels, and the tongue may be fixed, foldable or removable to reduce the footprint of the trailer 10 when stored. The tongue may also have a removable and/or retractable jack, and the tongue may have a motorized wheel to tow the trailer 10. The frame 12 has arms that define an opening in the trailer 10 in which a deck 16 is raised and lowered relative to the frame 12. Thus, a heavy load such as another vehicle can easily move onto the deck 16 when the deck 16 is in a lowered position. Then, the deck 16 can move into a raised position to provide clearance above the ground surface.

In the depicted embodiment, a pneumatic system powers the movement of the deck 16. A battery 18 or other power source supplies power to a motor or pump 20, which in turn compresses air in a reservoir 22. For instance, solar panels or an alternator can charge the batteries 18 and power the motor or pump 20. Compressed air can be selectively released from the reservoir 22, travel through one or more lines 24, and power an airbag 26, which uses the compressed air to provide physical movement or displacement. As described in further detail below, the airbag 26 physically moves a rail 28 towards a back end of the trailer 10 in some embodiments. This movement is translated to the deck 16 to move the deck 16 between a raised position and a lowered position. It will be appreciated that two lines 24 can extend from the reservoir 22 to two airbags 26 and two rails 28, with one rail 28 position on each side of the deck 16. It will be appreciated that the trailer may have fewer or greater than two airbags 26 per rail 28. In various embodiments, a tubular portion of the frame or tongue of the trailer 10 can serve as a reservoir 22.

Moreover, it will be appreciated that other systems can power movement of the deck 16 and/or other operations of the trailer 10. In some embodiments, hydraulics and the cantilever arm system described herein can be used to raise and lower the deck where a hydraulic accumulator or springs provides the suspension. In various embodiments, an electric or hydraulic winch with pulleys and cables can be used to raise and lower the deck where springs provide suspension. In some embodiments, electric or hydraulic motors with gears and screws can be used to raise and lower the deck where springs provide suspension. In various embodiments, a hydraulic cylinder and inclined planes can be used to raise and lower the deck where a hydraulic accumulator or springs provide suspension. Moreover, an electric motor such as a linear actuator can also serve as a system that powers movement of the deck 16 and/or other operations of the trailer 10.

It will be appreciated that the trailer 10 can have features that enclose the space around a vehicle when the vehicle is fully positioned on the trailer 10. For instance, a topper or other structure that defines an enclosed volume can be fixedly or selectively connected to the frame of the trailer 10.

Moreover, the back end of the trailer can have a manually or automatically powered roll up/roll down door that provides access to the enclosed volume. In some embodiments, a clamshell door folds down or a traditional door swings outward.

Figure 2A:
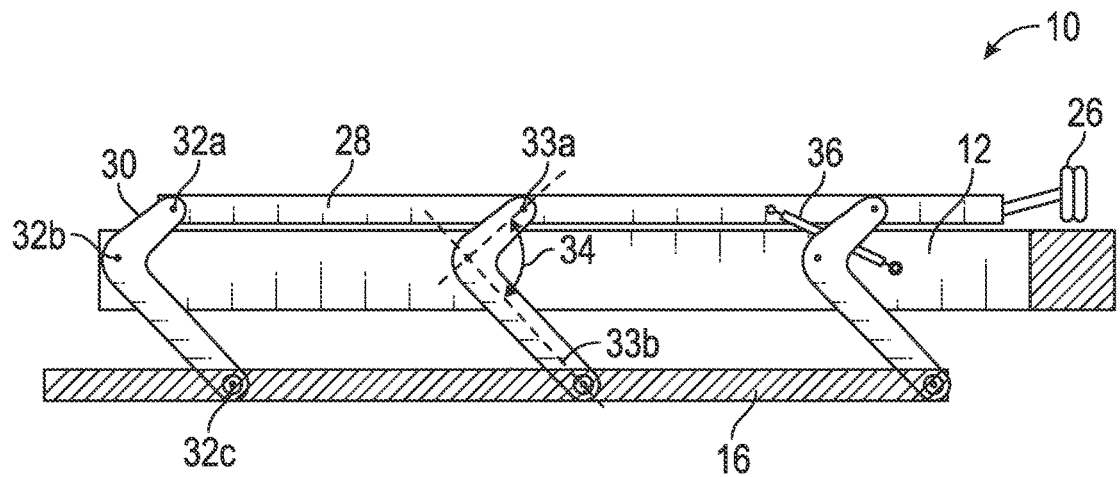
FIG. 2A is a cross-sectional elevation view of the trailer taken along line A-A in FIG. 1 where the deck is in a lowered position in accordance with an embodiment of the present disclosure.
Figure 2B:
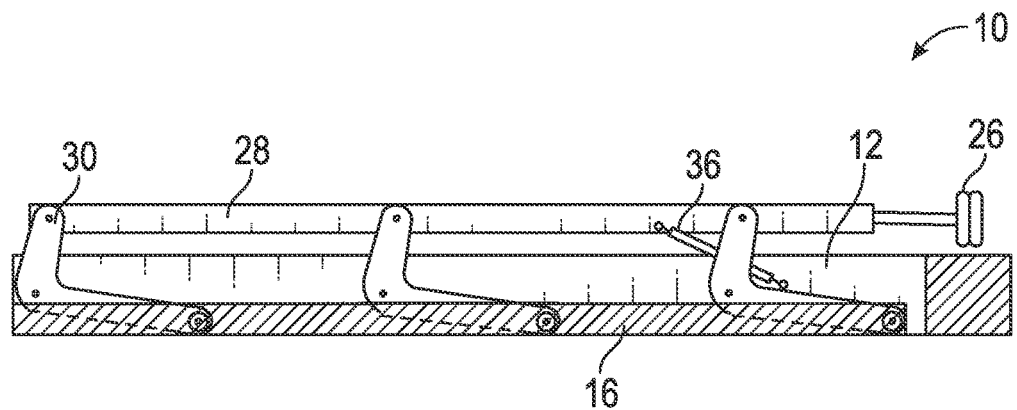
FIG. 2B is a cross-sectional elevation view of the trailer taken along line A-A in FIG. 1 where the deck is in a raised position in accordance with an embodiment of the present disclosure.

Referring now to FIGS. 2A and 2B, side elevation views of the deck 16 of a trailer 10 in a lowered position and a raised position, respectively, are provided. Moreover, FIGS. 2A and 2B are cross-sectional views taken along line A-A in FIG. 1. As described above, the trailer 10 has a frame 12 and a deck 16 as well as an airbag 26 that moves a rail 28. A plurality of cantilever arms 30 translates the movement of the rail 28 to the deck 16 to raise and lower the deck 16. Each cantilever arm 30 is connected to the rail 28, an inner surface of the frame 12, and an outer surface of the deck 16 with a respective pin 32a, 32b, 32c with roller 70 attached. Furthermore, each cantilever arm 30 is rotatable about the pin 32b connected to the frame 12. Therefore, when the airbag 26 physically moves the rail 28 toward a back end of the trailer 10, which is toward the left in FIGS. 2A and 2B, the rail 28 rotates the cantilever arms 30 about their respective frame pins 32b. Rotation of the cantilever arms 30 lifts the deck 16 from the lowered position to the raised position. The deck 16 is now cleared above the ground, and a vehicle can tow the trailer 10.

During operation, the pump and reservoir shown in FIG. 1 may need to compress additional air to compensate for any leaks in the pneumatic air system. Thus, the trailer 10 may further comprise various sensors such as pressure sensors or position sensors to monitor the components of the trailer 10. For example, if the pressure of the compressed air in the lines 24 and/or airbag 26 falls below a predetermined value, as detected by a sensor, then the battery 18 supplies power to the pump 20 to add compressed air within the reservoir 22. Next, the reservoir 22 can include a valve such as a pintle valve, a needle valve, etc. to selectively release compressed air into the lines 24. In various embodiments, an external source, such as another tank or compressor, can refill a reservoir 22 on the trailer 10 as required.

In addition, the pneumatic system serves as the suspension of the trailer 10. In the depicted embodiment, the wheels 14 are connected to the frame 12 of the trailer 10 without any suspension. When goods and materials are positioned on the deck 16, the combined mass of the trailer 10 and the goods and materials can result in a bumpy ride when the trailer 10 encounters speedbumps, potholes, and other similar impediments to a smooth ground surface. Thus, the pneumatic system allows the frame 12 to move relative to the deck 16 and the goods and materials in a dampened manner. As a result, not all of the momentum and force from the frame 12 and wheels 14 interacting with the ground surface is translated to the deck 16 and the goods and materials. However, an optional shock absorber 36 or dampener can be connected at one end to the rail 28 and at the other end to the frame 12 to absorb larger forces during transportation of the trailer. Moreover, more traditional suspension systems such as leaf springs, trailing links, torsion links, etc. can provide suspension for the trailer.

The shape and structure of each cantilever arm 30 also imparts advantages to the trailer 10. The distance between the pin 32a into the rail 28 and the pin 32b into the frame 12 is shorter than the distance between the pin 32b into the frame 12 and the pin 32c into the deck 16. Thus, the deck 16 imposes forces on the cantilever arm 30 that have mechanical advantage over the forces imposed on the cantilever 30 from the rail 28. As a result, the airbag 26, the rail 18, and the pneumatic system provide a softer suspension to the deck 16 and associated goods and materials.

Moreover, an axis 33a through the pin 32a into the rail 28 and the pin 32b into the frame 12 forms an angle 34 with an axis 33b through the pin 32b into the frame 12 and the pin 32c into the deck 16. In the depicted embodiment, the angle 34 is approximately 90 degrees. The terms "approximately" and "substantially" can mean a variation of 10% on a relative basis. In various embodiments, the angle 34 is between approximately 70 and 110 degrees. As shown in FIG. 2B, the angle 34 results in the cantilever arms 30 oriented such that the rail 28 in nearly an uppermost position. This affords a greater displacement of the rail 28 in both a substantially horizontal direction and a substantially vertical direction to absorb forces imparted on the cantilever arms 30 from the deck 16 and associated goods and materials.

Figure 3:
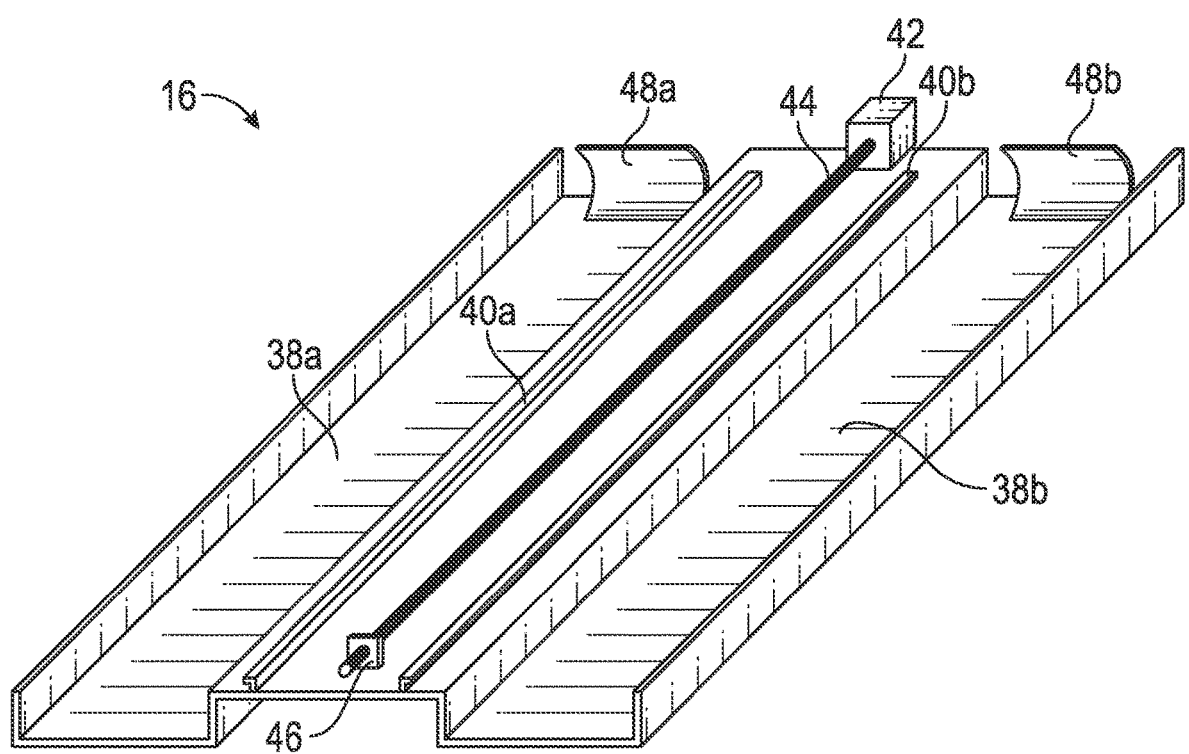
FIG. 3 is a perspective view of a deck of a trailer in accordance with an embodiment of the present disclosure.

Now referring to FIG. 3, a perspective view of the deck 16 and a loading system is provided. In some embodiments, the trailer can have an automatic or semi-automatic loadings system to move a vehicle onto the deck 16. As shown in FIG. 3, the deck 16 can have first and second tracks 38a, 38b for receiving the wheels of a vehicle. Extending substantially parallel to the tracks 38a, 38b are a pair of rails 40a, 40b that guide a carriage from a back end of the deck 16 to a front end. To power the carriage, a motor 42 is positioned at the front end of the deck 16, and a screw 44 extends from the motor 42, along the deck 16 between the tracks 38a, 38b, to a flange 46 that supports the screw 44 at the back end of the deck 16. The motor 42 can rotate the screw 44 to cause a carriage to move from the back end to the front end and load a vehicle onto the deck 16 until the front wheels contact wheel stops 48a, 48b for transportation. In some embodiments, the bottom side of the carriage has protrusions that reside in the grooves of the screw 44. Then, the motor 42 rotates the screw 44 in the opposite direction to unload the vehicle from the deck 16.

Figure 4A:
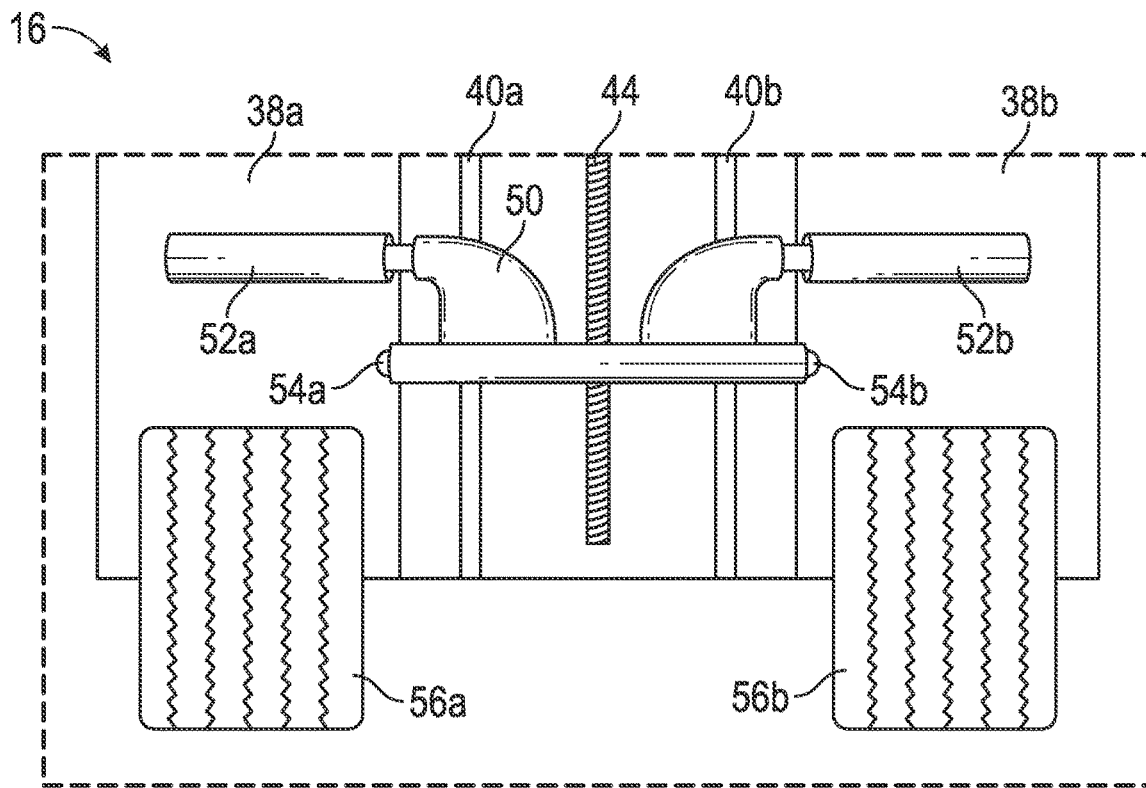
FIG. 4A is a top plan view of a loading carriage in a first position in accordance with an embodiment of the present disclosure.
Figure 4B:
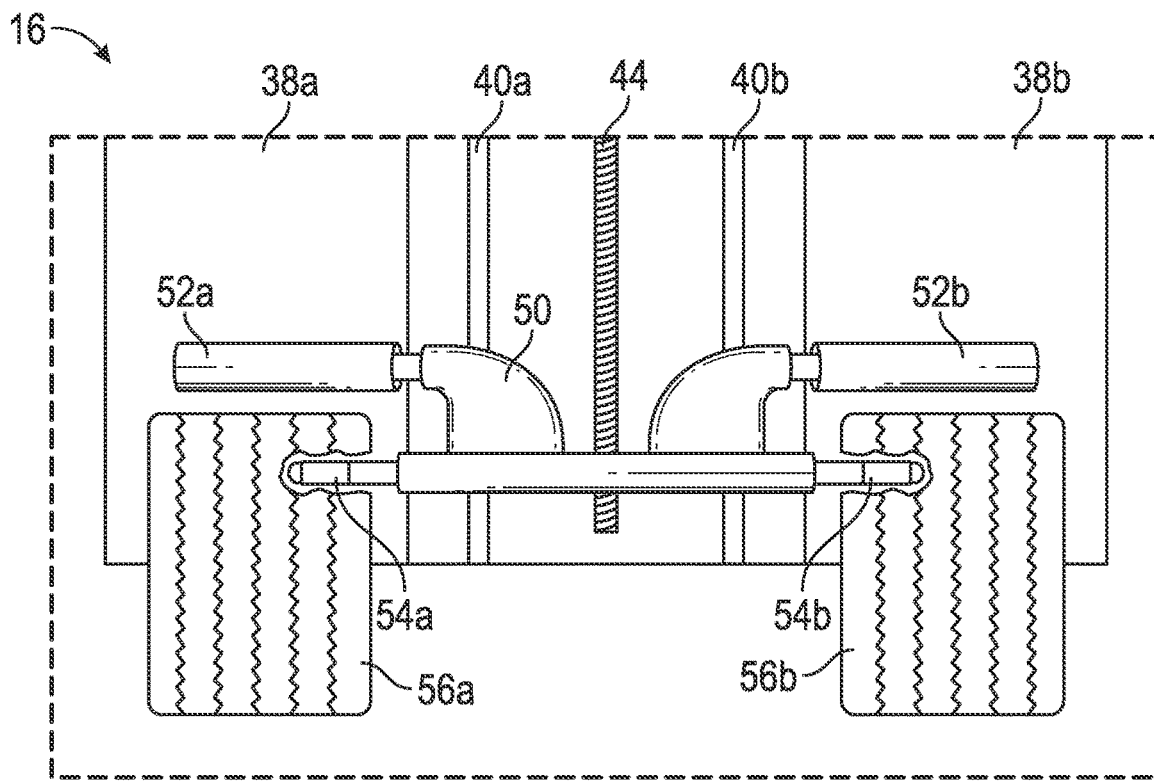
FIG. 4B is a top plan view of the loading carriage in FIG. 4A in a second position in accordance with an embodiment of the present disclosure.

Now referring to FIGS. 4A and 4B, top plan views of a carriage 50 in a first position and a second position, respectively, are provided. The carriage 50 has first and second front rollers 52a, 52b that extend over the first and second tracks 38a, 38b, respectively. The carriage 50 also has first and second rim rollers 54a, 54b that are retracted within the carriage 50 in FIG. 4A. To initiate the loading process, the wheels 56a, 56b of a vehicle approach the back end of the deck 16. The carriage 50 meets the wheels 56a, 56b, and the front rollers 52a, 52b contact or are positioned proximate to the wheels 56a, 56b. In some embodiments, the wheels 56a, 56b travel over a bar and/or are positioned between bars or within a recess in the deck to locate the wheels 56a, 56b in the proper position. Next, as shown in FIG. 4B, the rim rollers 54a, 54b extend from the carriage 50 to a position within the rims of the wheels 56a, 56b. Thus, the first front roller 52a and the first rim roller 54a secure the first wheel 56a, and the second front roller 52b and the second rim roller 54b secure the second wheel 56b. Now, the screw 44 can rotate and move the carriage 50 from a position at the back end of the deck 16 to a position tight against the wheel stops at the front end of the deck 16 such that the vehicle is completely positioned on the deck 16.

It will be appreciated that the present disclosure encompasses alternatives to a motor and screw 44 combination. In some embodiments, an electric or hydraulic drive with a chain and pulley system can be used to traverse the carriage 50. In various embodiments, an electric or hydraulic drive with a belt and pulley system can be used to traverse the carriage 50. In some embodiments, a carriage 50 can have a platform on which front wheels of a vehicle to pull onto, and the front wheels are secured using baskets or clamps operated by electric, hydraulic or pneumatics. It will be further appreciated that in some embodiments, the carriage 50 does not comprise front rollers 52a, 52b but rather a non-rotating structure or no structure at all.

The loading process can be completely automatic or semi-automatic in some embodiments. For instance, a sensor such as a mass sensor on the deck 16 or carriage 50 can detect the mass of the wheels 56a, 56b on the back end of the deck 16. This can initiate movement of the carriage 50 toward the back end of the deck 16 until the front rollers 52a, 52b contact, or are positioned proximate to, the wheels 56a, 56b. Then, the rim rollers 54a, 54b extend outward, and the carriage 50 moves the wheels 56a, 56b toward the front end of the deck 16 and moves the vehicle onto the deck 16. A control unit operably connected to any sensors, the motor for the screw 44, and any other components of the trailer to control the automatic loading process. For instance, the control unit can receive a signal from one or more sensors, and then the control unit causes the motor to turn the screw 44 and the carriage 50 to secure wheels of a vehicle.

A semi-automatic loading process can include any of these actions but where a user manually initiates the action or performs the action. For example, the wheels 56a, 56b can be manually secured to the carriage 50 by manually extending the rim rollers 54a, 54b. Alternatively, a user can manually strap the wheels 56a, 56b onto a portion of the carriage 50 positioned in the tracks 38a, 38b. Similarly, a user can interact with a display or input device such as a button associated with the control device to, for instance, initiate and/or control the motor and screw 44 and the movement of the carriage 50 along the deck 16. It will be appreciated that the input device can be remotely operated using a mobile device operably connected to a control device on the trailer via a near field communication protocol such as Bluetooth®.

Figure 5A:
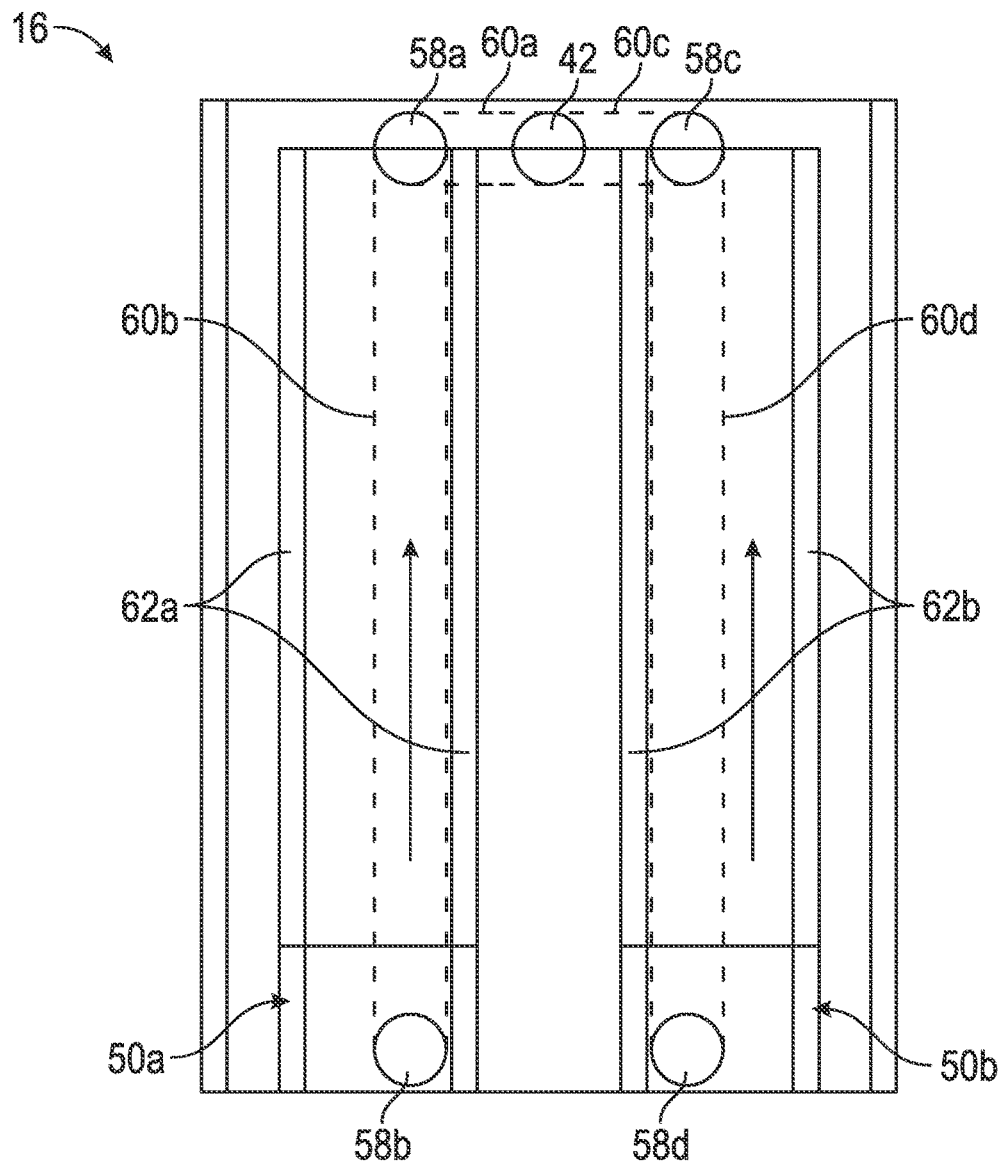
FIG. 5A is a top plan view of another loading carriage in accordance with an embodiment of the present disclosure.
Figure 5B:
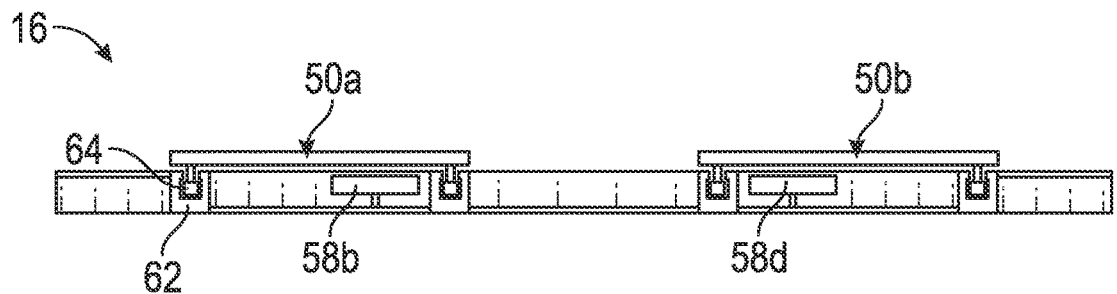
FIG. 5B is a rear elevation view of the loading carriage in FIG. 5A in accordance with an embodiment of the present disclosure.

Now referring to FIGS. 5A and 5B, a top plan view of a deck 16 and carriage system as well as a rear elevation view of a deck 16 and carriage system are provided, respectively. In this embodiment, separate carriages 50a, 50b directly receive the front wheels of a vehicle. The carriages 50a, 50b move along the length of the deck 16 along rails or struts 62a, 62b. Like the embodiments shown in FIGS. 4A and 4B, once the front wheels of the vehicle are secured to the carriages 50a, 50b, the carriages 50a, 50b move toward the front end of the deck 16 to load the vehicle onto the deck 16. However, in this embodiment, an arrangement of sprockets and chains drive the movement of the carriages 58a, 58b. The wheels of the vehicle can be restrained with rollers, safety chains, powered safety pins (pneumatic, hydraulic, electric), manual lever, tie downs, etc.

Specifically, a motor 42 is arranged at a front of the deck 16, and the motor turns two chains 60a, 60c, which then turn two sprockets 58a, 58c, respectively. Next, the sprockets 58a, 58c drive respectively chains 60b, 60d around further sprockets 58b, 58d as shown in FIG. 5A. The carriage can be connected to these chains 60b, 60d to travel up and down the deck 16. In some embodiments, the rotation of the motor 42 turns the initial chains 60a, 60c in the same direction, clockwise or counterclockwise, and thus, the other chains 60b, 60d also turn in the same direction. In these embodiments, the first carriage 50a is connected to the one side of the chain 60b, left or right, and the second carriage 50b is also connected to the same side of its chain 60d. In other embodiments, an idler sprocket or other feature can allow the motor 42 to drive the initial chains 60a, 60c in opposing directions. In these embodiments, the chains 60b, 60d that drive the carriages 50a, 50b rotate in opposite directions. Accordingly, the first carriage 50a is connected to, for example, the left side of the chain 60b as shown in FIG. 5A, and the second carriage 50b is connected to, for example, the right side of the chain 60d.

FIG. 5B shows the carriages 50a, 50b each have rollers 64, pins, or other features that travel within a strut 62 that extends along the length of the deck 16. In this embodiment, the open side of the strut faces upwards, and the carriage 50a, 50b and rollers 64 rest on top of the struts 62. In other embodiments, the open side of the strut faces downwards, and the carriages 50a, 50b and rollers 64 hang from the struts 62 allowing the carriages 50a, 50b to be positioned closer to a ground surface.

Though FIGS. 5A and 5B depict a chain and sprocket system, other systems can be used to achieve the same or similar functionality. For example, cables, belts, straps, linear actuators, hydraulic systems, and pneumatic systems can move the carriages 50a, 50b.

Figure 6A:
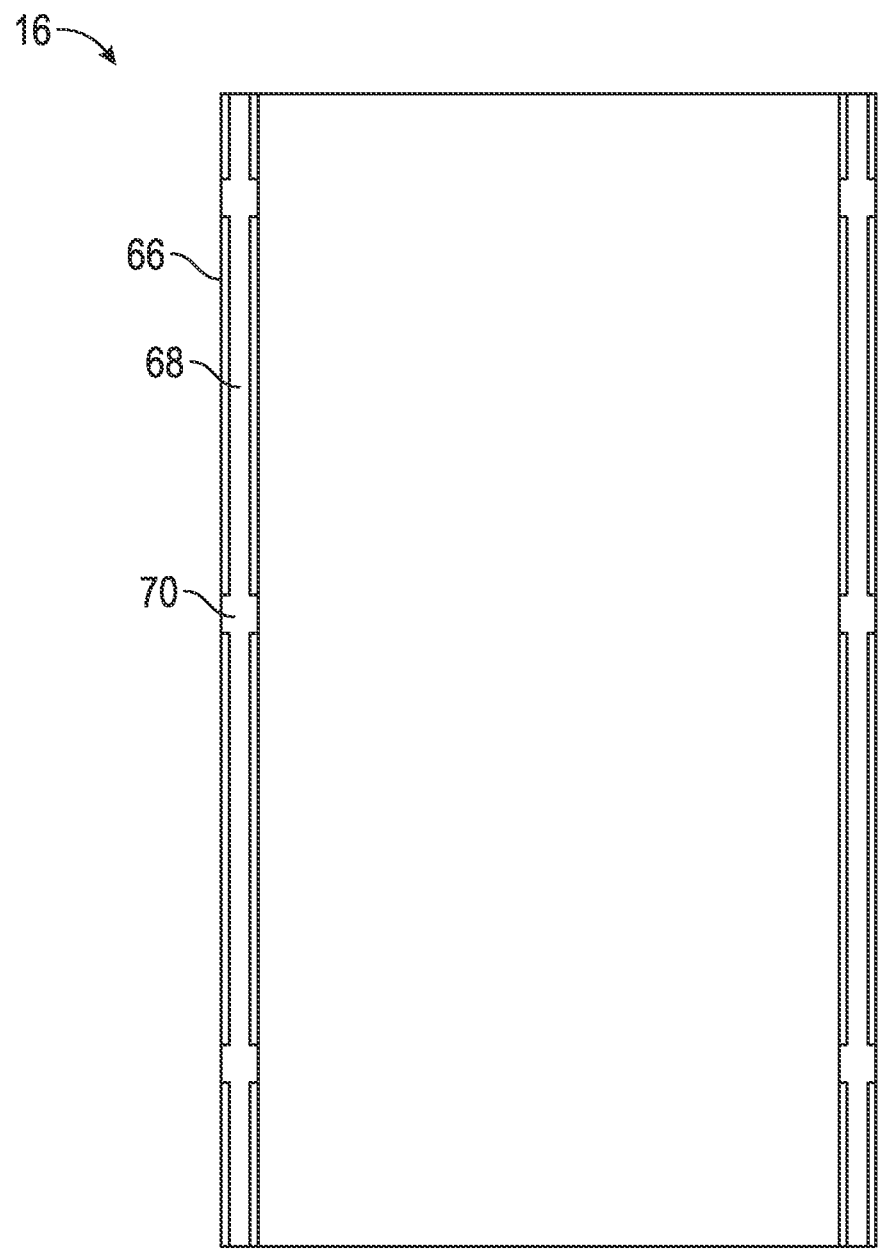
FIG. 6A is a top plan view of a deck in accordance with an embodiment of the present disclosure.

Now referring to FIG. 6A, a top plan view of a deck 16 is provided where struts 66 selectively receive the lower ends of the cantilever arms of the trailer. In this embodiment, each of the left side and the right side of the deck 16 has a strut 66 that extends from a back end to a front end of the deck 16. The open side of a strut 66 of the deck 16 faces upwards, and the channel 68 on the open side extends along the length of the strut 66. Openings 70 with a larger diameter than the channel 68 are positioned at points along the strut 66, and a pin on the lower end of a cantilever arm descends into these openings 70 to selectively engage the deck 16 with the trailer. With three cantilever arms on each side of the trailer, each strut 66 has three openings 70. Although, the struts 66 shown in FIG. 6A extend along the entire length of the deck 16, in some embodiments, several struts 66 can be positioned on each side of the deck 16 to save weight and material. It will be appreciated that various embodiments of the present disclosure can have greater or fewer than three arms per side of the deck.

Figure 6B:
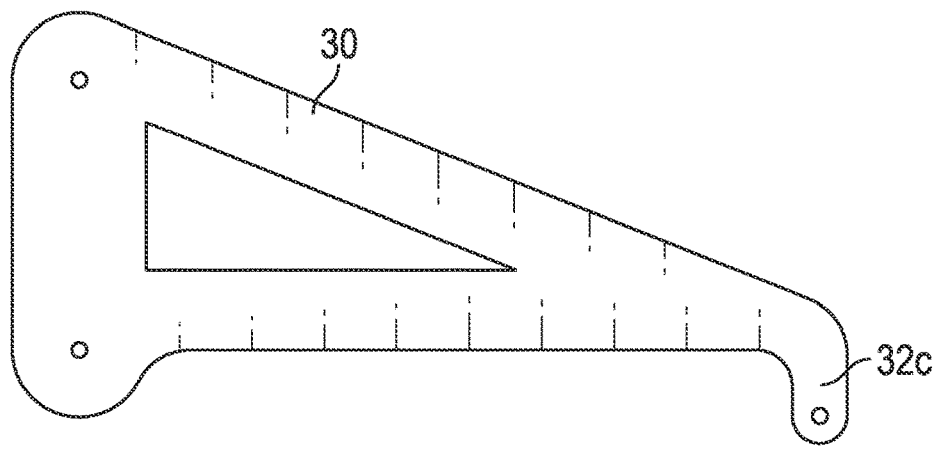
FIG. 6B is a side elevation view of a cantilever arm in accordance with an embodiment of the present disclosure.
Figure 6C:
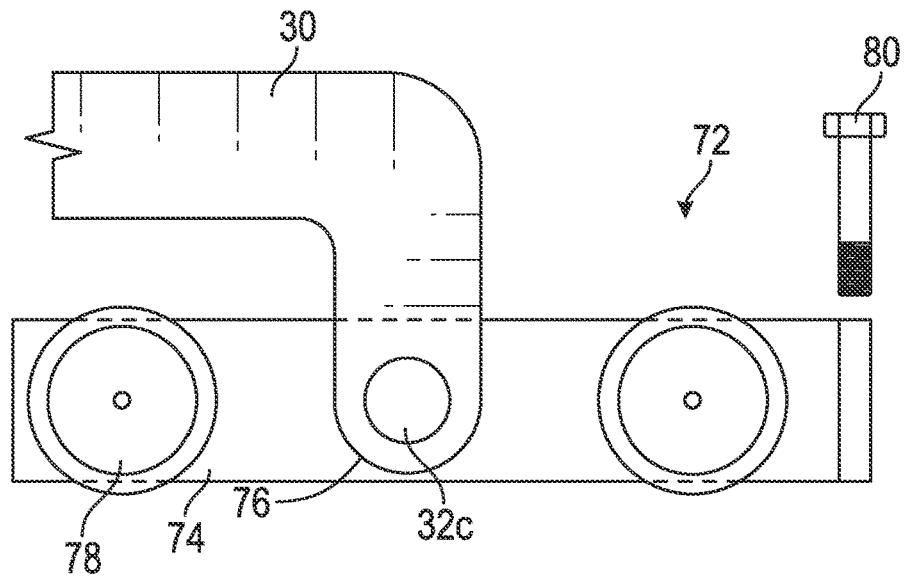
FIG. 6C is a side elevation view of a cantilever arm and a roller assembly in accordance with an embodiment of the present disclosure.
Figure 6D:
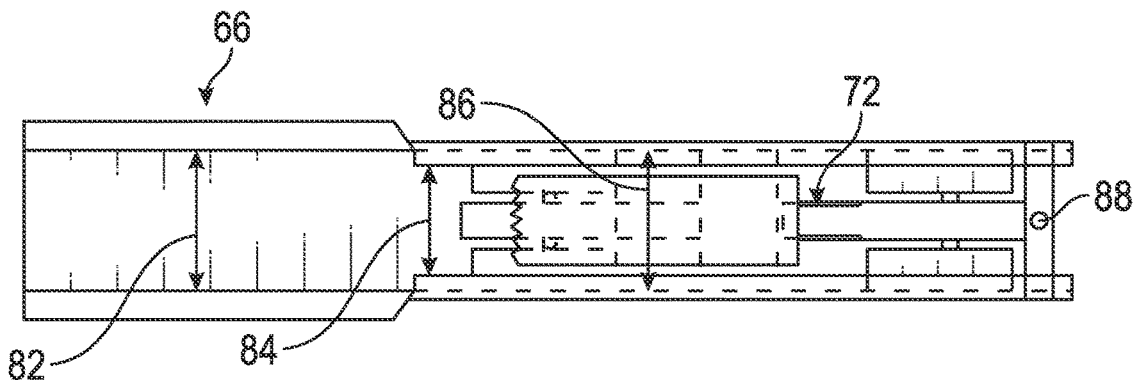
FIG. 6D is a top plan view of an assembly and cantilever arm selectively engaged with a strut of a deck in accordance with an embodiment of the present disclosure.

Now referring to FIGS. 6B-6D, various figures show the engagement between cantilever arm and a roller assembly positioned in a strut of the deck. FIG. 6B shows an alternative embodiment of the cantilever arm 30 with a lower pin 32c. FIG. 6C is a side elevation view of a roller assembly 72 with a body 74 and rollers 78 or wheels positioned at either end of the body. A recess 76 is positioned between the rollers 78, and in addition, a pin 80 can selectively extend through a portion of the body 74 of the roller assembly 72.

FIG. 6D is a top plan view of the roller assembly 72 positioned in a strut 66. The roller assembly 72 can travel along the length of the strut 66, and the cross sectional shape of the strut 66 retains the roller assembly 72. Moreover, brackets or other structures can be positioned in or on the strut to confine the travel of the roller assembly 72 within the strut. Thus, the roller assembly 72 can move between a first position where the roller assembly 72 selectively receives the lower pin 32c of the cantilever arm 30 within the recess 76, and a second position where the pin 32c is secured to the roller assembly 72, and the trailer can operate as described herein.

The roller assembly 72 is depicted in the second position in FIG. 6D. The opening of the strut has a diameter 82 that is larger than a diameter 84 of the channel of the strut. In addition, a width 86 of the lower pin is smaller than the diameter 82 of the opening but greater than a diameter 84 of the channel. Thus, in the first position, the pin 32c can pass through the opening and into the recess of the roller assembly 72. Then, the roller assembly 72 moves to the second position where the pin 32c is confined and secured within the strut. The aforementioned pin 80 can pass through part of the strut to secure the roller assembly 72 in the second position. To remove the deck from the trailer, the process is reversed.

Figure 7A:
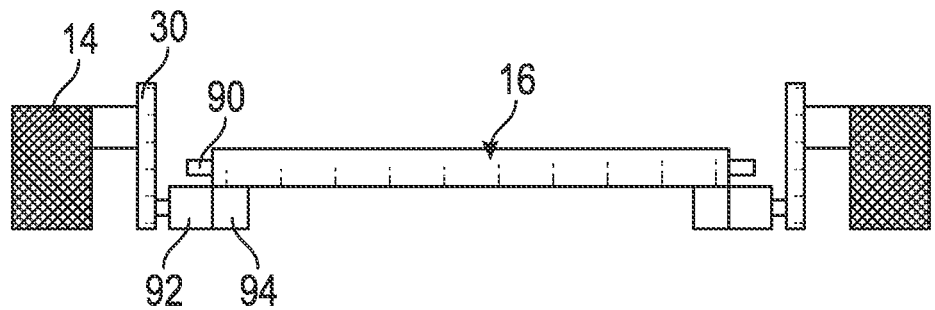
FIG. 7A is a rear elevation view of a trailer in accordance with an embodiment of the present disclosure.
Figure 7B:
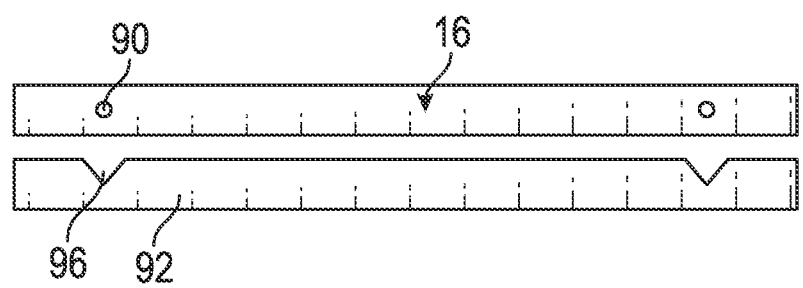
FIG. 7B is a side elevation view of a deck and deck connection rail in accordance with an embodiment of the present disclosure.
Figure 7C:
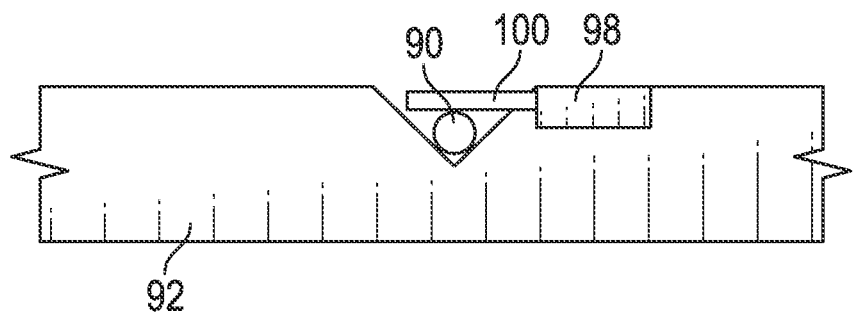
FIG. 7C is a side elevation view of a deck secured to a deck connection rail in accordance with an embodiment of the present disclosure.

Now referring to FIGS. 7A-7C, various views of another embodiment for selectively connecting a deck to the trailer is provided. Referring to FIG. 7A, a rear elevation view of a trailer with wheels 14, cantilever arms 30, and a deck 16 is provided. The deck 16 has pins 90 extending from the sides of the deck 16. In some embodiments, two pins 90 extend from the left side of the deck 16, and two pins 90 extend from a right side of the deck 16. Next, a deck connection rail 92 is rotatably connected to the lower pins of the cantilever arms 30 on the left side of the frame of the trailer, and another deck connection rail is rotatably connected to the lower pins of the cantilever arms 30 on the right side of the frame of the trailer. Each deck connection rail 92 has one or more recesses 96 or depressions that correspond to the pins 90 on the side of the deck 16, as shown in the side elevation view of the deck 16 and rail 92 in FIG. 7B.

As shown in FIG. 7A, a series of jacks 94 can raise and lower the deck 16 relative to the connection rails 92. In some embodiments, four jacks 94, one at each corner of the deck 16, raise and lower the deck 16. However, it will be appreciated that pneumatic systems and other systems can raise and lower the deck 16. In FIG. 7B the deck 16 is positioned above the connection rail 92. Then, in FIG. 7C, the deck 16 is lowered onto the connection rail 92 such that the pins 90 are positioned within the recesses 96 on the top surface of the connection rail 92. Finally, a pin 100 driven by an actuator 98 can complete the connection between the deck 16 and the frame such that the trailer can operate as described herein. Though FIG. 7C shows an actuator 98 and pin 100 other means can selectively engage the pins 90 or other feature of the deck 16.

The description of the present disclosure has been presented for purposes of illustration and description, but is not intended to be exhaustive or limiting of the disclosure to the form disclosed. Many modifications and variations will be apparent to those of ordinary skill in the art. The embodiments described and shown in the figures were chosen and described in order to best explain the principles of the disclosure, the practical application, and to enable those of ordinary skill in the art to understand the disclosure.

While various embodiments of the present disclosure have been described in detail, it is apparent that modifications and alterations of those embodiments will occur to those skilled in the art. Moreover, references made herein to "the present disclosure" or aspects thereof should be understood to mean certain embodiments of the present disclosure and should not necessarily be construed as limiting all embodiments to a particular description. It is to be expressly understood that such modifications and alterations are within the scope and spirit of the present disclosure, as set forth in the following claims.

What is claimed is:

1. A drop deck trailer with a lifting and suspension system, comprising:
a frame having an inner surface that defines an opening, said frame having a plurality cantilever arms rotatably connected to said inner surface;
a rail rotatably connected to an upper end of each cantilever arm of said plurality of cantilever arms;
a deck positioned in said opening of said frame and rotatably connected to a lower end of each cantilever arm of said plurality of cantilever arms;
a power system operably connected to an end of said rail, wherein said power system displaces said rail in a substantially horizontal direction to raise and lower said deck in a substantially vertical direction, and said power system dampens a relative movement between said frame and said deck; and
a dampener having one end connected to said rail and another end connected to said frame to further dampen said relative movement between said frame and said deck.

2. The drop deck trailer of claim 1, wherein said power system is a pneumatic air system having:
a pump operably connected to a reservoir;
an airbag operably connected to said reservoir and operably connected to said end of said rail, wherein said pump increases air pressure in said reservoir, which selectively pressurizes said airbag to displace said rail and move said deck in said substantially vertical direction.

3. The drop deck trailer of claim 1, wherein said power system is a hydraulic system having:
a pump operably connected to an accumulator;
a cylinder operably connected to said accumulator and operably connected to said end of said rail, wherein said pump increases a pressure of a working fluid in said accumulator, which drives a piston of said cylinder to displace said rail and move said deck in said substantially vertical direction.

4. The drop deck trailer of claim 1, wherein, for each cantilever arm of said plurality of cantilever arms, an axis between the rotatable connections with said rail and said frame forms an angle with an axis between the rotatable connections with said frame and said deck, wherein said angle is between 70 degrees and 110 degrees.

5. The drop deck trailer of claim 4, wherein, for each cantilever arm of said plurality of cantilever arms, a distance between the rotatable connections with said rail and said frame is less than a distance between the rotatable connections with said frame and said deck.

6. The drop deck trailer of claim 1, further comprising a carriage that is movable between a back end and a front end of said deck to draw a vehicle onto said deck.

7. A drop deck trailer with a powered loading system, comprising:
a frame having an inner surface that defines an opening, said frame having a plurality of cantilever arms rotatably connected to said inner surface;
a deck positioned in said opening of said frame and rotatably connected to a lower end of each cantilever arm of said plurality of cantilever arms such that said deck is raised and lowered relative to said frame;
a carriage positioned on a top surface of said deck, wherein said carriage is configured to receive at least one wheel of a vehicle;
first and second rim rollers connected to said carriage, wherein said first and second rim rollers are configured to extend outward in a lateral direction of said deck to secure two wheels of said vehicle to said carriage; and
a power system which drives said carriage in a longitudinal direction of said deck from a back end of said deck to a front end of said deck to draw said vehicle onto said deck.

8. The drop deck trailer of claim 7, further comprising a chain loop connected to said carriage, wherein said power system is a motor with a shaft that drives said chain loop in one direction to move said carriage from said back end to said front end of said deck, and said shaft drives said chain loop in an opposing direction to move said carriage from said front end to said back end of said deck.

9. The drop deck trailer of claim 8, further comprising a second carriage connected to a second chain loop, wherein said shaft drives said second chain loop such that both carriages move from said back end to said front end as said shaft rotates in one direction, and both carriages move from said front end to said back end as said shaft rotates in said opposing direction.

10. The drop deck trailer of claim 7, further comprising at least one guide rail positioned on said deck, wherein said carriage has at least one roller positioned in said at least one guide rail to secure and direct movement of said carriage between said back end and said front end of said deck.

11. The drop deck trailer of claim 10, wherein said at least one guide rail is a strut with an open end, and said roller travels within said strut.

12. The drop deck trailer of claim 7, further comprising a rail rotatably connected to an upper end of each cantilever arm of said plurality of cantilever arms, and a second power system operably connected to an end of said rail, wherein said second power system displaces said rail in a substantially horizontal direction to raise and lower said deck in a substantially vertical direction, and said second power system dampens a relative movement between said frame and said deck.

13. A drop deck trailer with a selectively attachable deck, comprising:
a deck extending between a front end and a back end, said deck having a channel extending along said deck, and said deck having an opening extending into said channel;
a frame having an arm extending proximate to a side of said deck, said arm having an inner surface; and
a plurality of cantilever arms rotatably connected to said inner surface of said arm, wherein a pin on a lower end of a cantilever arm of said plurality of cantilever arms has a width that is less than a width of said opening and greater than a width of said channel, and said pin extends through said opening to selectively connect said deck and said frame.

14. The drop deck trailer of claim 13, further comprising:
a roller assembly positioned within said channel and configured to move through said channel, and wherein said pin is received in a recess of said roller assembly to selectively connect said deck and said frame.

15. The drop deck trailer of claim 14, wherein said roller assembly comprises at least two rollers, and said recess is positioned between two rollers.

16. The drop deck trailer of claim 14, wherein said roller assembly is in a first position proximate to said opening to receive said pin, and said roller assembly moves to a second position in said channel to lock said pin within said channel.

17. The drop deck trailer of claim 16, further comprising a second pin that selectively engages said channel and said roller assembly to lock said roller assembly in said second position and said pin of said cantilever arm within said channel.

18. The drop deck trailer of claim 13, wherein said channel is an open end of a strut, and said open end is oriented upwards.

19. A drop deck trailer with a powered loading system, comprising:
a frame having an inner surface that defines an opening, said frame having a plurality of cantilever arms rotatably connected to said inner surface;
a deck positioned in said opening of said frame and rotatably connected to a lower end of each cantilever arm of said plurality of cantilever arms such that said deck is raised and lowered relative to said frame;
a carriage positioned on a top surface of said deck, wherein said carriage is configured to receive at least one wheel of a vehicle;
a chain loop connected to said carriage; and
a power system which drives said carriage in a longitudinal direction of said deck from a back end of said deck to a front end of said deck to draw said vehicle onto said deck, wherein said power system is a motor with a shaft that drives said chain loop in one direction to move said carriage from said back end to said front end of said deck, and wherein said shaft drives said chain loop in an opposing direction to move said carriage from said front end to said back end of said deck.

20. A drop deck trailer with a powered loading system, comprising:
a frame having an inner surface that defines an opening, said frame having a plurality of cantilever arms rotatably connected to said inner surface;
a deck positioned in said opening of said frame and rotatably connected to a lower end of each cantilever arm of said plurality of cantilever arms such that said deck is raised and lowered relative to said frame;
a carriage positioned on a top surface of said deck, wherein said carriage is configured to receive at least one wheel of a vehicle;
a power system which drives said carriage in a longitudinal direction of said deck from a back end of said deck to a front end of said deck to draw said vehicle onto said deck; and
at least one guide rail positioned on said deck, wherein said carriage has at least one roller positioned in said at least one guide rail to secure and direct movement of said carriage between said back end and said front end of said deck.

* * * * *